United States Patent
Roberts et al.

(10) Patent No.: US 9,840,395 B2
(45) Date of Patent: Dec. 12, 2017

(54) MULTI-DRIVE THRUST MANAGER FOR ELEVATOR CONTROL

(71) Applicant: Otis Elevator Company, Farmington, CT (US)

(72) Inventors: Randall Roberts, Hebron, CT (US); David Ginsberg, Granby, CT (US); Konda Reddy Chevva, Ellington, CT (US); Walter Thomas Schmidt, Marlborough, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/214,648

(22) Filed: Jul. 20, 2016

(65) Prior Publication Data

US 2017/0036887 A1    Feb. 9, 2017

Related U.S. Application Data

(60) Provisional application No. 62/200,175, filed on Aug. 3, 2015.

(51) Int. Cl.

| | |
|---|---|
| H02K 41/00 | (2006.01) |
| H02P 3/18 | (2006.01) |
| B66B 1/30 | (2006.01) |
| B66B 11/04 | (2006.01) |
| H02K 41/03 | (2006.01) |
| B66B 9/00 | (2006.01) |

(52) U.S. Cl.
CPC ............ B66B 1/30 (2013.01); B66B 11/0407 (2013.01); H02K 41/031 (2013.01); B66B 9/003 (2013.01)

(58) Field of Classification Search
USPC ............................................. 187/247; 318/38
See application file for complete search history.

(56) References Cited

U.S. PATENT DOCUMENTS 5,141,082 A  *  8/1992  Ishii ........................ H02K 41/03
                                                       187/289
6,202,794 B1 *  3/2001  Hakala .................... B66B 11/08
                                                       187/277

FOREIGN PATENT DOCUMENTS

WO    2015084365    6/2015

OTHER PUBLICATIONS

EP Application No. 16182564.1 Extended European Search Report, dated Dec. 21, 2016, 8 pages.

* cited by examiner

Primary Examiner — Christopher Uhlir
(74) Attorney, Agent, or Firm — Cantor Colburn LLP

(57) ABSTRACT

According to an aspect, an elevator system includes a propulsion system having a plurality of motor segments forming a primary portion and a plurality of drives to impart force on a secondary portion coupled to an elevator car. The elevator system also includes a controller operable to identify a local neighborhood of the drives and determine a health status of each of the drives within the local neighborhood. The controller is further operable to adjust a thrust command per active drive of the local neighborhood based on at least one of the health status and a position of each active drive of the local neighborhood with respect to the secondary portion.

20 Claims, 6 Drawing Sheets

MULTI-DRIVE THRUST MANAGER FOR ELEVATOR CONTROL

CROSS-REFERENCE TO RELATED APPLICATIONS

This patent application claims priority to U.S. Provisional Application No. 62/200,175, filed Aug. 3, 2015, which is incorporated herein by reference in its entirety.

BACKGROUND

The subject matter disclosed herein relates generally to the field of elevators, and more particularly to a multi-drive thrust manager for elevator control in an elevator system.

Self-propelled elevator systems, also referred to as ropeless elevator systems, are useful in certain applications (e.g., high rise buildings) where the mass of the ropes for a roped system is prohibitive and there is a desire for multiple elevator cars to travel in a single lane to reduce elevator core space in the building. There exist self-propelled elevator systems in which a first lane is designated for upward traveling elevator cars and a second lane is designated for downward traveling elevator cars under normal operating conditions. A transfer station at each end of the hoistway is used to move cars horizontally between the first lane and second lane. Additional lanes can also be supported and directions of up and down travel in these lanes can be changed to optimize passenger transfer.

One type of elevator propulsion system for ropeless elevator systems includes a linear motor, such as an electrically-controlled linear synchronous motor that propels elevator cars between linear motor segments. Smooth motion control requires coordination between multiple drives that control a multiplicity of linear motor segments. Failure of a motor segment and/or its associated drive may result in a noticeable degradation in ride smoothness in vertical and/or lateral directions.

BRIEF DESCRIPTION

According to one embodiment, an elevator system includes a propulsion system having a plurality of motor segments forming a primary portion and a plurality of drives to impart force on a secondary portion coupled to an elevator car. The elevator system also includes a controller operable to identify a local neighborhood of the drives and determine a health status of each of the drives within the local neighborhood. The controller is further operable to adjust a thrust command per active drive of the local neighborhood based on at least one of the health status and a position of each active drive of the local neighborhood with respect to the secondary portion.

According to another embodiment, a method includes identifying, by a controller, a local neighborhood of drives in a propulsion system. The propulsion system includes a plurality of motor segments forming a primary portion and a plurality of drives to impart force on secondary portion coupled to an elevator car. A health status of each of the drives within the local neighborhood is determined. The controller adjusts a thrust command per active drive of the local neighborhood based on at least one of the health status and a position of each active drive of the local neighborhood with respect to the secondary portion.

In the above embodiments, or in the alternative, the controller is further operable to detect the position of the secondary portion based on a sensed location of the elevator car in a hoistway.

In the above embodiments, or in the alternative, the controller is further operable to determine the position of each active drive of the local neighborhood based on drive location table data that defines a location of each of the drives in the hoistway.

In the above embodiments, or in the alternative, the controller is further operable to provide the thrust command per active device to a commanding drive of the local neighborhood that implements a feedback control or a combination of feedback and feedforward control with respect to the active drives of the local neighborhood.

In the above embodiments, or in the alternative, adjustment of the thrust command per active drive attempts to optimize motion of the elevator car by adjusting thrust and moments applied to the elevator car.

In the above embodiments, or in the alternative, adjustment of the thrust command per active drive is further based on geometric coverage of each active drive with respect to the secondary portion.

In the above embodiments, or in the alternative, the motor segments are linearly arranged on opposite sides of the elevator car, and the local neighborhood of the drives spans across the opposite sides of the elevator car.

In the above embodiments, or in the alternative, the local neighborhood of the drives is dynamically defined as the elevator car moves.

In the above embodiments, or in the alternative, the controller is further operable to monitor and adjust thrust for local neighborhoods of the drives surrounding each of one or more additional elevator cars.

In the above embodiments, or in the alternative, the health status of each of the drives within the local neighborhood is determined by one or more of: comparing performance of the drives with respect to one or more of: an average value, a threshold value, or at least one neighboring drive value; detecting a loss of drive communication; detecting a drive internal error; and detecting a power distribution failure.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments allocate thrust commands to multiple drives of a primary portion of a propulsion system in an elevator system based on relative positioning with respect to a secondary portion and drive health. Drive health may be degraded due to a failure of a drive or its associated motor segment in the propulsion system. Examples of drive component failures that may degrade drive health include power electronics, transformers, breakers, cables, connectors, micro-controllers, batteries, chargers, and sensors. Examples of motor segment failures that may degrade drive health include coils, connectors, and structural elements. Thrust commands to remaining active drives can be rescaled to account for an inactive/failed drive when they are designed to have additional capacity to handle these failure conditions. In some embodiments, the rescaling can be substantially uniform to the active drives in a local neighborhood of drives surrounding an elevator car in a hoistway. In other embodiments, moment effects are included in the thrust adjustment computation to prevent a rocking motion as the elevator car passes an inactive drive, for instance, by adjusting thrust levels on the left and right side of motor sections.

Figure 1:
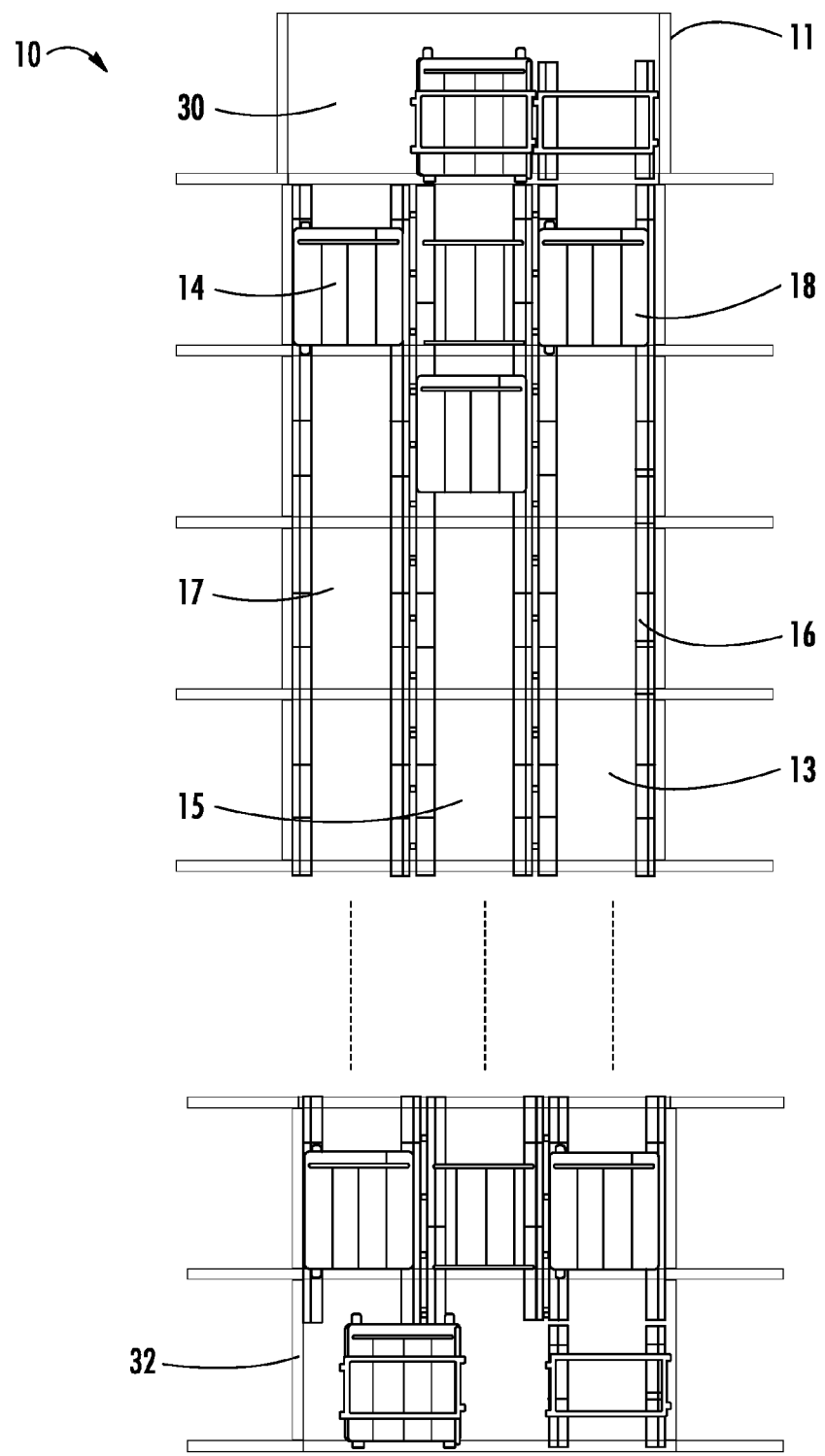
FIG. 1 depicts an elevator system in accordance with an exemplary embodiment.

FIG. 1 depicts an example of an elevator system 10 in an exemplary embodiment. Elevator system 10 includes a hoistway 11 having a plurality of lanes 13, 15 and 17. While three lanes are shown in FIG. 1, it is understood that embodiments may be used with elevator systems have any number of lanes. In the example of FIG. 1, in each lane 13, 15, 17, one or more elevator cars 14 travel in a same direction, i.e., up or down. For example, in FIG. 1 elevator cars 14 in lanes 13 and 15 travel up and elevator cars 14 in lane 17 travel down. One or more elevator cars 14 may travel in a single lane 13, 15, and 17 in the same direction within each lane. Alternatively, one or more elevator cars 14 may travel in different directions within one or more lanes.

In the example of FIG. 1, above the top floor is an upper transfer station 30 to impart horizontal motion to elevator cars 14 to move elevator cars 14 between lanes 13, 15 and 17. It is understood that upper transfer station 30 may be located at the top floor, rather than above the top floor. Below the first floor is a lower transfer station 32 to impart horizontal motion to elevator cars 14 to move elevator cars 14 between lanes 13, 15 and 17. It is understood that lower transfer station 32 may be located at the first floor, rather than below the first floor. Although not shown in FIG. 1, one or more intermediate transfer stations may be used between the first floor and the top floor. Intermediate transfer stations are similar to the upper transfer station 30 and lower transfer station 32. In embodiments where bidirectional movement is supported within the same lane, transfer stations may be omitted.

In some embodiments, elevator cars 14 are propelled using a linear motor system having a primary, fixed portion 16 and a secondary, moving portion 18. The primary portion 16 includes windings or coils mounted at one or both sides of the lanes 13, 15 and 17. Secondary portion 18 includes permanent magnets mounted to one or both sides of cars 14. Primary portion 16 is supplied with drive signals to control movement of cars 14 in their respective lanes.

Figure 2:
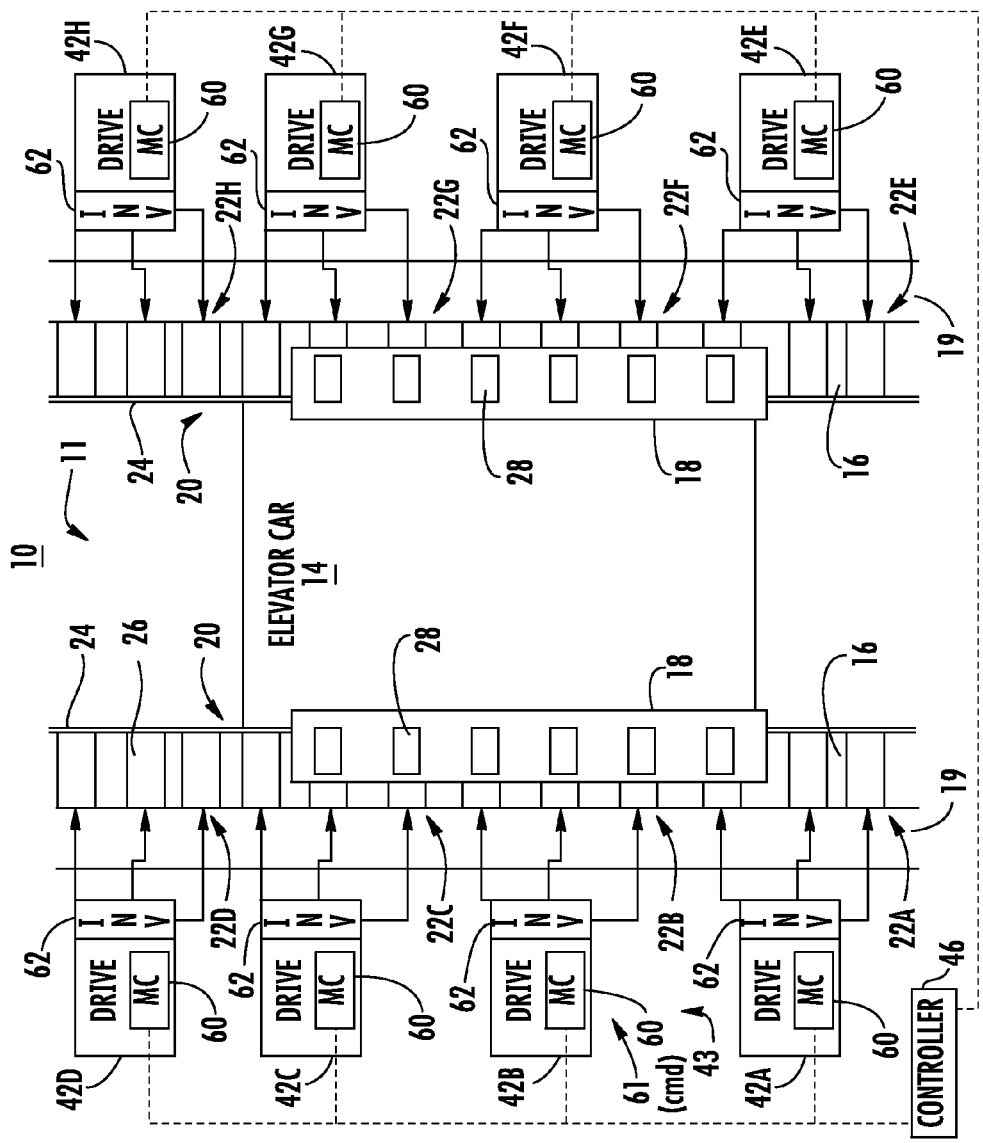
FIG. 2 depicts a portion of the elevator system in accordance with an exemplary embodiment.

FIG. 2 depicts another view of an exemplary embodiment of the elevator system 10 including an elevator car 14 that travels in hoistway 11. Elevator car 14 is guided by one or more guide rails 24 extending along the length of hoistway 11, where the guide rails 24 may be affixed to structural members 19. In some embodiments, the elevator system 10 employs a linear propulsion system 20, where primary portion 16 includes multiple motor segments 22 that are linearly arranged on opposite sides of the elevator car 14, and each motor segment 22 includes one or more coils 26 (i.e., phase windings). Primary portion 16 may be mounted to one or more guide rails 24, incorporated into the guide rails 24, or may be located apart from guide rails 24. Primary portion 16 serves as a stator of a permanent magnet synchronous linear motor to impart force to elevator car 14. Secondary portion 18 is mounted to the elevator car 14 and includes an array of one or more permanent magnets 28 as a second portion of the linear propulsion system 20. Coils 26 of motor segments 22 may be arranged in three phases, six phases, or multiples thereof, as is known in the electric motor art. Each of the phases may have one or more coils 26, such as a pair of coils 26 per phase, where current can flow in opposite directions in each coil 26 when paired in a phase. The coils 26 may be formed about ferromagnetic cores, placed on a ferromagnetic support, or be coreless. Various coil configurations can be used to electrically connect the coils 26, such as a star configuration where coils 26 are in electrical series from a respective drive phase leg to a neutral point. Primary portion 16 may be mounted in the hoistway 11, to coact with permanent magnets 28 mounted to elevator car 14. The permanent magnets 28 may be positioned on two sides of elevator car 14. Alternate embodiments may use a single primary portion 16—secondary portion 18 configuration, or multiple primary portion 16—secondary portion 18 configurations. It will be understood that any number (i.e., one or more) primary/guide rail structures can be included per lane.

In the example of FIG. 2, there are eight motor segments 22 depicted as motor segments 22A, 22B, 22C, 22D, 22E, 22F, 22G, and 22H. Each of the motor segments 22A-22H has a corresponding drive 42A-42H. In an embodiment, higher-level control within the hoistway 11 can be commanded and monitored by controller 46, where the controller 46 can communicate with one or more motion controls 60. Commands from the controller 46 are with respect to elevator car 14 positioning within the hoistway 11, e.g., movement between floors of a building. Therefore, the controller 46 can command movement of the elevator car 14 upward or downward in the hoistway 11, e.g., to a different floor of a building, and the motion controls 60 implement lower-level (i.e., motor level) control to energize portions of the linear propulsion system 20 to realize the commanded movement. The one or more motion controls 60 convert commands from the controller 46 into motor-level commands to drive the motor segments 22. The one or more motion controls 60 provide drive signals to the motor segments 22A-22H via drives 42A-42H to control motion of the elevator car 14. Each of the drives 42A-42H can include an inverter 62 that commands current to one or more of the motor segments 22. Each of the drives 42A-42H can include a separate instance of the motion control 60, where each motion control 60 is operable to command at least one of the drives 42A-42H coupled to motor segments 22A-22H.

To efficiently coordinate control as the elevator car 14 is repositioned within hoistway 11, a motion control 60 proximate to the elevator car 14 can be designated as a commanding drive 61 to issue commands to neighboring drives 42. For example, motion control 60 of drive 42B in FIG. 2 can be designated as commanding drive 61, whereby the commanding drive 61 issues commands locally to drives 42A-42C and drives 42E-42G (i.e., neighboring drives) in a local neighborhood 43 of the drives 42, where the local neighborhood 43 is dynamically defined as the elevator car 14 moves and the local neighborhood 43 spans to drives 42 across the opposite sides of the elevator car 14. As the elevator car 14 moves within the hoistway 11, for instance in an upward direction, the designation of the commanding drive 61 transitions between the motion controls 60. For example, when motor segments 22A and 22E no longer provide thrust as the elevator car 14 advances to at least partially overlap motor segments 22D and 22H, the motion control 60 of drives 42C or 42G can be designated as the commanding drive 61 to issue commands to drives 42B-42D and drives 42F-42H, thus changing the drives 42 included in local neighborhood 43. One or more sensors, such as position/velocity sensor 64 (FIG. 3), can provide position and/or velocity information to the drives 42 and/or controller 46. Alternatively, the elevator car 14 may include one or more sensors, such as position and velocity sensors (not depicted), to wirelessly provide sensor data from the elevator car 14 to one or more of the drives 42 via one or more wireless link. Additional sensors can be incorporated within or wired to the drives 42 and/or controller 46.

The commanding drive 61 can control drives 42 on opposite sides of the hoistway 11. In an alternate embodiment, one of the motion controls 60 on each side of the hoistway 11 is designated as commanding drive 61 with respect to the elevator car 14. Regardless of whether a single motion control 60 or multiple motion controls 60 are designated as commanding drive 61, the designation of the commanding drive 61 changes as the elevator car 14 moves up or down in the hoistway 11 such that the commanding drive 61 remains in close physical proximity to the elevator car 14. Keeping the commanding drive 61 in close physical proximity to the elevator car 14 ensures substantially consistent latency between the commanding drive 61 and the drives 42 that are actively imparting motion to the elevator car 14.

Each motion control 60 may be implemented using a microprocessor executing a computer program stored on a storage medium to perform the operations described herein. Alternatively, one or more of the motion controls 60 may be implemented in hardware (e.g., ASIC, FPGA) or in a combination of hardware/software. Although a single motion control 60 may be provided to control the operation of each drive 42, in alternate embodiments, the motion control 60 can be located external to the drives 42 and may have a one-to-many relationship with respect to the drives 42 rather than the one-to-one relationship as depicted in FIG. 2. To achieve a higher communication bandwidth, the communication range of each motion control 60 can be relatively short to interface with a local neighborhood of drives 42 rather than all drives 42 of the hoistway 11.

Figure 3:
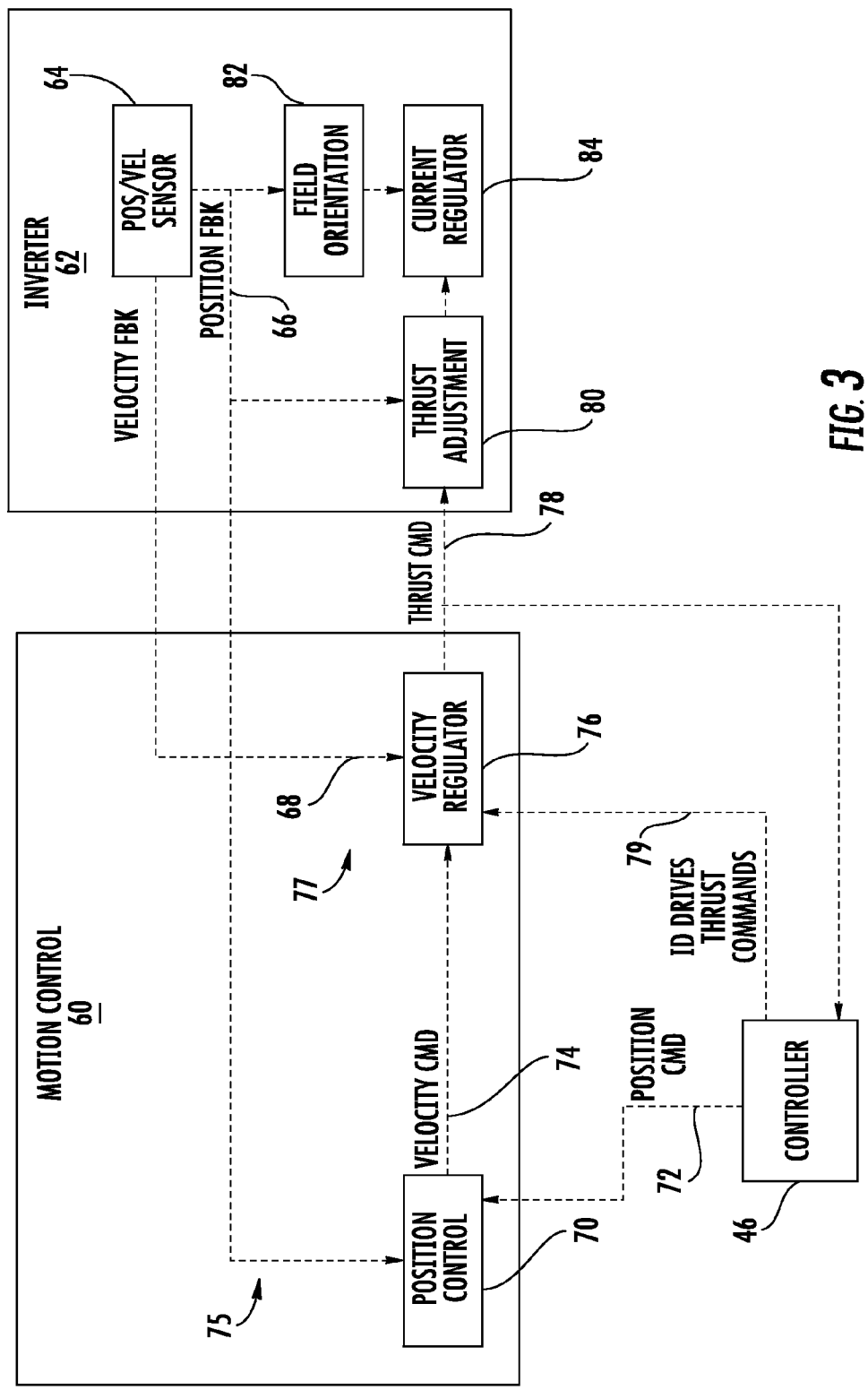
FIG. 3 depicts a control block diagram of a portion of an elevator system in accordance with an exemplary embodiment.

FIG. 3 depicts a control block diagram of a portion of elevator system 10 in accordance with an exemplary embodiment. In the example of FIG. 3, rather than receiving position and velocity data from the elevator car 14, the inverter 62 may include a position/velocity sensor 64 that provides position feedback 66 and velocity feedback 68 to the motion control 60. In an alternate embodiment, the position/velocity sensor 64 is a virtual sensor that provides the position feedback 66 and velocity feedback 68 based on values received, for example, from one or more sensing systems (not depicted). As a further alternative, the position/velocity sensor 64 can be directly connected to the motion control 60. A position control 70 of the motion control 60 may receive a position command 72 from controller 46 and the position feedback 66 from the inverter 62.

The position control 70 can apply a conventional proportional-integral (PID) control to generate a velocity command 74 based on the position command 72 and the position feedback 66 as part of a position feedback control loop 75. The controllers could have a feedforward component in addition to feedback control. A velocity regulator 76 of the motion control 60 receives the velocity command 74 and the velocity feedback 68 and generates a thrust command 78 as part of a velocity feedback control loop 77. The controller 46 can also provide identified drives thrust commands 79 that identify which active drives require a thrust adjustment and a thrust adjustment amount to offset an inactive drive. The thrust command 78 may be generated using a conventional PID control for linear motors and rescaled based on the identified drives thrust commands 79, and the thrust command 78 may be fed back to the controller 46 to support drive thrust requests for the whole elevator car 14. Thrust adjustment 80 of the inverter 62 can further augment the thrust command 78 based on the position feedback 66 (i.e., for inner control loop closure). Modification to the thrust command 78 may also be performed directly on the inverter 62 if the identified drives thrust commands 79 are available to the thrust adjustment 80. Field orientation 82 is also performed with respect to the position feedback 66. The thrust adjustment 80 and field orientation 82 provide input to a current regulator 84 that can command current to one or more motor segments 22 of FIG. 2.

While only a single inverter 62 is depicted in FIG. 3, motion control 60 can simultaneously control multiple inverters 62 of the drives 42 of FIG. 2, for instance, six or more inverters 62 may be simultaneously controlled by a single motion control 60. Thus, each instance of motion control 60 designated as the commanding drive 61 of FIG. 2 is operable to establish a velocity feedback control loop 77 and a position feedback control loop 75 relative to each of the inverters 62 of the neighboring drives 42, as well as a local drive 42 in which the commanding drive 61 may reside. One or more feedforward controllers may also be incorporated.

Figure 4:
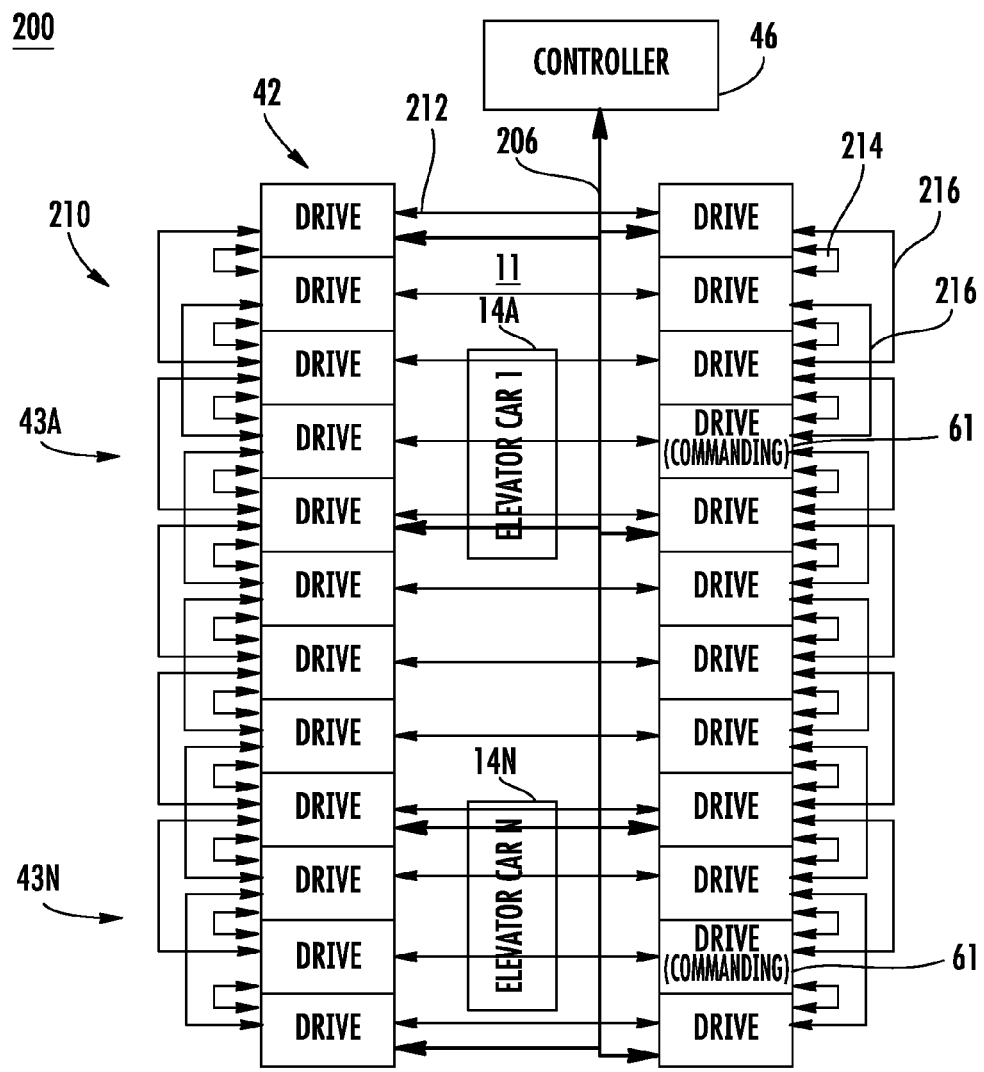
FIG. 4 depicts a portion of a control network of an elevator system in accordance with an exemplary embodiment.

FIG. 4 depicts a portion of a control network 200 of elevator system 10 in accordance with an exemplary embodiment. In the example of FIG. 4, a hoistway communication network 206 enables communication between the controller 46 and the drives 42. The drives 42 can communicate with each other via a local communication network 210. In the example of FIG. 4, the local communication network 210 includes a number of point-to-point links. A cross-hoistway link 212 may link drives 42 across the hoistway 11. A one-hop neighbor link 214 can link adjacent drives 42. A two-hop neighbor link 216 may link drives 42 offset by two positions such that one drive 42 is skipped between a pair of drives 42. Additional links may also be included (not depicted). Thus, a commanding drive 61 may communicate with neighbor drives 42 using a combination of one or more of the cross-hoistway link 212, one-hop neighbor link 214, and two-hop neighbor link 216 of the local communication network 210. Further, the hoistway communication network 206 need not link to all of the drives 42, as commands from the controller 46 may be relayed between drives 42 using the cross-hoistway link 212 and/or neighbor links 214, 216. As a further option, one or more communication bridges can be incorporated in the control network 200, for instance, as part of the hoistway communication network 206.

Each commanding drive 61 can control neighboring drives 42 that fully and partially overlap with the position of each elevator car 14A-14N. There can be one commanding drive 61 designated per elevator car 14A-14N. In an alternate embodiment, each side of the hoistway 11 has a separate commanding drive 61 per elevator car 14A-14N that is paired across the hoistway and transitions between drives 42 as the elevator car 14A-14N move. Drives 42 surrounding elevator car 14A are part of local neighborhood 43A that is dynamically defined as the elevator car 14A moves. Similarly, drives 42 surrounding elevator car 14N are part of local neighborhood 43N that is dynamically defined as the elevator car 14N moves. Each local neighborhood 43A-43N can be monitored and receive thrust commands in parallel from the controller 46 to adjust for inactive drives, where local instances of the commanding drive 61 in each local neighborhood 43A-43N compute and distribute thrust commands to local active drives surrounding each of the elevator cars 14A-14N.

Figure 5:
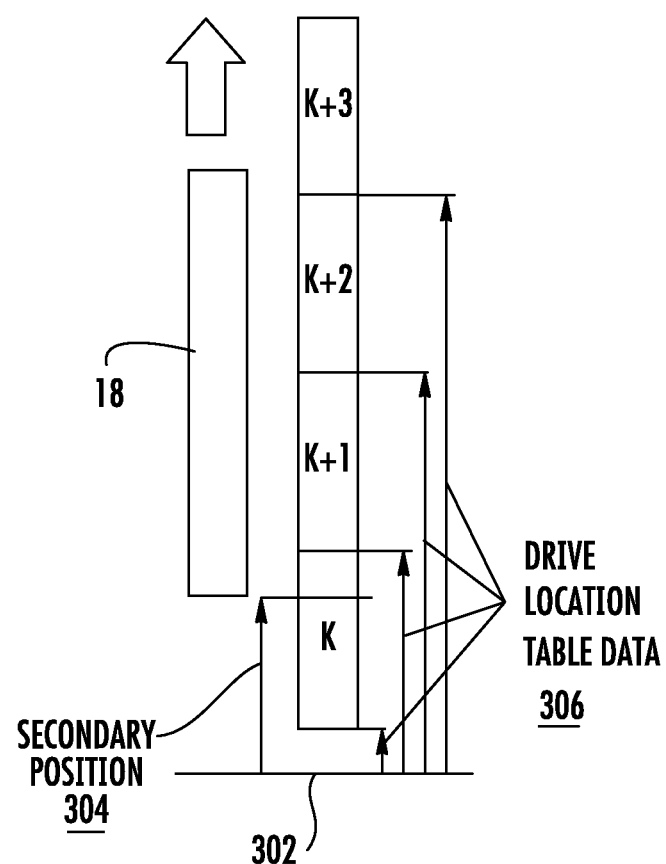
FIG. 5 depicts positioning of a secondary with respect to multiple drives of an elevator system in accordance with an exemplary embodiment.

FIG. 5 depicts a positioning relationship 300 of secondary portion 18 with respect to multiple drives 42 of elevator system 10 in accordance with an exemplary embodiment. A reference position 302 can be defined with respect to the hoistway 11 of FIG. 4 for determining a secondary position 304 of secondary portion 18. A position sensor, e.g., position/velocity sensor 64 of FIG. 3, may be used in determining the secondary position 304 by providing a sensed location of elevator car 14 in hoistway 11 to controller 46. Identifiers and location information for each of the drives 42 can be stored in drive location table data 306. For example, distances of drives 42 identified as drive K, drive K+1, drive K+2, drive K+3, etc. can be predefined with respect to the reference position 302 upon installation of the drives 42 in hoistway 11 and stored in drive location table data 306. Comparing the secondary position 304 to position data stored in the drive location table data 306 can be used to determine geometric coverage of each active drive with respect to secondary portion 18. Alternatively, field interactions between the drives 42 and secondary portion 18 can be used to determine geometric coverage of each active drive with respect to secondary portion 18.

Figure 6:
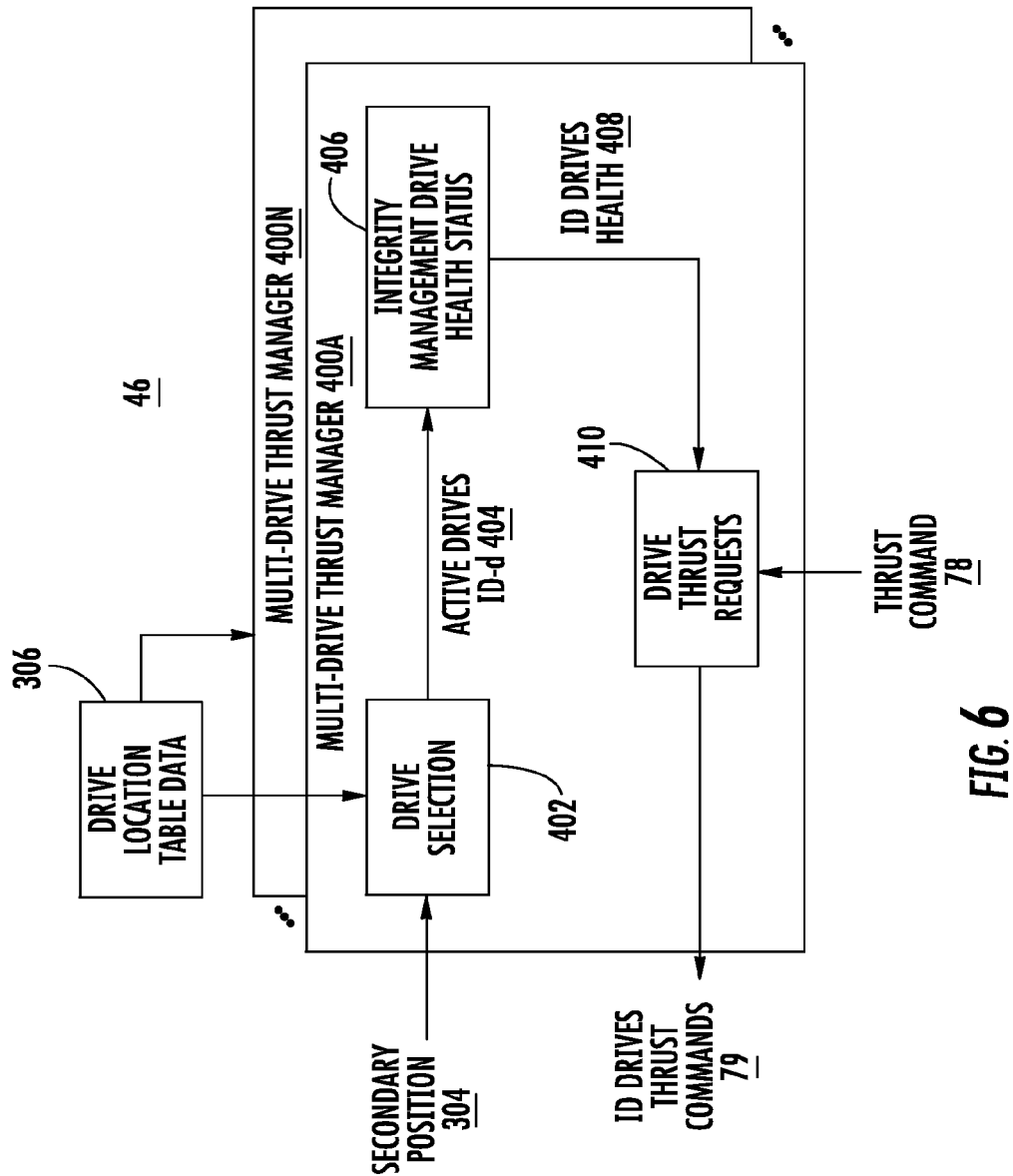
FIG. 6 depicts a block diagram of a controller including one or more multi-drive thrust managers of an elevator system in accordance with an exemplary embodiment.

FIG. 6 depicts a block diagram of a portion of controller 46 including one or more multi-drive thrust managers 400A-400N of elevator system 10 in accordance with an exemplary embodiment. Each elevator car 14A-14N can have an associated multi-drive thrust manager 400A-400N to determine the identified drives thrust commands 79 that identify which active drives require a thrust adjustment and a thrust adjustment amount to offset an inactive drive. The drive location table data 306 is made available to each of the multi-drive thrust managers 400A-400N. Based on a secondary position 304 associated with a corresponding elevator car 14, drive selection 402 identifies active drives 404, for instance, based on geometric overlap of the secondary position 304 and positions of the drives 42 (where lengths of the secondary portion 18 and motor segments 22 of primary portion 16 are known). Each of the multi-drive thrust managers 400A-400N can determine the position of each active drive of respective local neighborhoods 43A-43N based on the drive location table data 306 that defines a location of each of the drives 42 in the hoistway 11.

Integrity management drive health status 406 can perform health checks on the identified active drives 404 and pass identified drive health 408 to drive thrust requests 410. The drive thrust requests 410 can determined the identified drives thrust commands 79 based on thrust command 78 for the whole elevator car 14 and the identified drive health 408. The health status of the local neighborhood 43 of the drives 42 can be determined by comparing performance of the drives 42 with respect to one or more of: an average value, a threshold value, or at least one neighboring drive value, in addition to numerous other comparison options described herein. For instance, an average current or back electromotive force can be tracked for each drive 42 and monitored as the elevator cars 14A-14N move in hoistway 11. Additional examples that can cause health status updates include conditions such as a loss of drive communication, a drive detected internal error, and/or a power distribution failure. Health status in the identified drive health 408 can be determined by comparing information collected for the same drive 42 over a period of time, comparing the performance of the drive 42 to other drives in hoistway 11, and/or comparing current or back electromotive force to a minimum threshold value.

Drive thrust requests 410 can indicate a desired thrust or adjustment to thrust to offset for an inactive drive and output the identified drives thrust commands 79. Drive thrust requests 410 can adjust a thrust command per active drive of each respective local neighborhood 43A-43N based on the health status and a position of each active drive of the local neighborhood 43A-43N with respect to secondary portion 18. For example, drive thrust requests 410 of multi-drive thrust manager 400A may determine that greater thrust is needed in active drives neighboring an inactive drive in local neighborhood 43A surrounding elevator car 14A. Adjustment of the thrust command per active drive attempts to optimize motion of the elevator car 14A by adjusting thrust and moments applied to the elevator car 14A to account for a failed motor segment or a failed drive in the local neighborhood 43A of the drives 42 and/or to account for variations among drives 42 and motor segments 22. Adjustment of the thrust command per active drive is further based on geometric coverage of each active drive with respect to the secondary portion 18. For instance, active drives associated with motor segments 22 that fully overlap secondary portion 18 can impart a greater force on the elevator car 14A as compared to drives 42 that partial overlap with secondary portion 18. The controller 46 provides the identified drives thrust commands 79 as a thrust command per active device to a commanding drive 61 of the local neighborhood 43A that implements a feedback control, such as the feedback control depicted in FIG. 3, with respect to the active drives of the local neighborhood 43A.

While the examples described herein are directed to a linear propulsion system, it will be understood that the controller 46 can be implemented in non-linear propulsion systems, e.g., rotary propulsion systems, which include a plurality of drives/motors that interact with a secondary.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
   a propulsion system comprising a plurality of motor segments forming a primary portion and a plurality of drives to impart force on a secondary portion coupled to an elevator car; and
   a controller operable to identify a local neighborhood of the drives, determine a health status of each of the drives within the local neighborhood, and adjust a thrust command per active drive of the local neighborhood based on at least one of the health status and a position of each active drive of the local neighborhood with respect to the secondary portion.

2. The elevator system of claim 1, wherein the controller is further operable to detect a position of the secondary portion based on a sensed location of the elevator car in a hoistway.

3. The elevator system of claim 2, wherein the controller is further operable to determine the position of each active drive of the local neighborhood based on drive location table data that defines a location of each of the drives in the hoistway.

4. The elevator system of claim 1, wherein the controller is further operable to provide the thrust command per active drive to a commanding drive of the local neighborhood that implements a feedback control or a combination of feedback and feedforward control with respect to the active drives of the local neighborhood.

5. The elevator system of claim 1, wherein adjustment of the thrust command per active drive attempts to optimize motion of the elevator car by adjusting thrust and moments applied to the elevator car.

6. The elevator system of claim 5, wherein adjustment of the thrust command per active drive is further based on geometric coverage of each active drive with respect to the secondary portion.

7. The elevator system of claim 1, wherein the motor segments are linearly arranged on opposite sides of the elevator car, and the local neighborhood of the drives spans across the opposite sides of the elevator car.

8. The elevator system of claim 7, wherein the local neighborhood of the drives is dynamically defined as the elevator car moves.

9. The elevator system of claim 1, further comprising one or more additional elevator cars, wherein the controller is further operable to monitor and adjust thrust for local neighborhoods of drives surrounding each of the one or more additional elevator cars.

10. The elevator system of claim 1, wherein the health status of each of the drives within the local neighborhood is determined by one or more of:
comparing performance of the drives with respect to one or more of: an average value, a threshold value, or at least one neighboring drive value;
detecting a loss of drive communication;
detecting a drive internal error; and
detecting a power distribution failure.

11. A method comprising:
identifying, by a controller, a local neighborhood of drives in a propulsion system, the propulsion system comprising a plurality of motor segments forming a primary portion and a plurality of drives to impart force on a secondary portion coupled to an elevator car;
determining a health status of each of the drives in the local neighborhood; and
adjusting, by the controller, a thrust command per active drive of the local neighborhood based on at least one of the health status and a position of each active drive of the local neighborhood with respect to the secondary portion.

12. The method of claim 11, further comprising:
detecting a position of the secondary portion based on a sensed location of the elevator car in a hoistway.

13. The method of claim 12, further comprising:
determining the position of each active drive of the local neighborhood based on drive location table data that defines a location of each of the drives in the hoistway.

14. The method of claim 11, further comprising:
providing the thrust command per active drive to a commanding drive of the local neighborhood that implements a feedback control or a combination of feedback and feedforward control with respect to the active drives of the local neighborhood.

15. The method of claim 11, wherein adjustment of the thrust command per active drive attempts to optimize motion of the elevator car by adjusting thrust and moments applied to the elevator car.

16. The method of claim 15, wherein adjustment of the thrust command per active drive is further based on geometric coverage of each active drive with respect to the secondary portion.

17. The method of claim 11, wherein the motor segments are linearly arranged on opposite sides of the elevator car, and the local neighborhood of drives spans across the opposite sides of the elevator car.

18. The method of claim 17, further comprising:
dynamically defining the local neighborhood of drives as the elevator car moves.

19. The method of claim 11, further comprising:
monitoring and adjusting thrust, by the controller, for local neighborhoods of drives surrounding each of one or more additional elevator cars.

20. The method of claim 11, wherein the health status of each of the drives within the local neighborhood is determined by one or more of:
comparing performance of the drives with respect to one or more of: an average value, a threshold value, or at least one neighboring drive value;
detecting a loss of drive communication;
detecting a drive internal error; and
detecting a power distribution failure.

* * * * *